(12) United States Patent
Sadanowicz et al.

(10) Patent No.: US 7,117,599 B2
(45) Date of Patent: Oct. 10, 2006

(54) METHOD OF MANUFACTURING A CORNER ASSEMBLY

(75) Inventors: David Thomas Sadanowicz, Canton, MI (US); Larry William Brackmann, Brighton, MI (US)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 10/904,206

(22) Filed: Oct. 28, 2004

(65) Prior Publication Data

US 2006/0096096 A1    May 11, 2006

(51) Int. Cl.
| | |
|---|---|
| B62D 7/18 | (2006.01) |
| B21K 1/40 | (2006.01) |
| B21K 1/04 | (2006.01) |
| B23P 17/00 | (2006.01) |
| B23P 11/00 | (2006.01) |
| B21D 53/10 | (2006.01) |
| F16C 32/00 | (2006.01) |

(52) U.S. Cl. .......................... 29/894.361; 29/894.362; 29/898.062; 29/898.063; 29/898.066; 29/898.07; 29/898.09; 29/407.05; 29/407.1; 29/434; 29/509; 29/512; 29/557; 29/559; 280/93.512; 384/560; 82/1.11

(58) Field of Classification Search ........... 29/894.361, 29/894.362, 898.062, 898.063, 898.066, 29/898.07, 898.09, 407.05, 407.09, 407.1, 29/434, 509, 512, 557, 558, 559; 280/93.512; 384/448, 560; 82/1.11, 112; 269/909
See application file for complete search history.

(56) References Cited

U.S. PATENT DOCUMENTS

| | | | |
|---|---|---|---|
| 4,150,468 A * | 4/1979 | Harbottle | ............ 29/898.09 |
| 4,203,635 A * | 5/1980 | Reiter | ............ 384/560 |
| 5,496,055 A | 3/1996 | Shibahata et al. | |
| 5,556,210 A | 9/1996 | Fukumura | |
| 6,212,981 B1 | 4/2001 | Brinker et al. | |
| 6,398,240 B1 | 6/2002 | Taylor | |
| 6,406,186 B1 | 6/2002 | Toril et al. | |
| 6,464,399 B1 * | 10/2002 | Novak et al. | ............ 384/477 |
| 6,532,666 B1 | 3/2003 | Denny et al. | |
| 6,585,420 B1 | 7/2003 | Okada et al. | |
| 6,626,580 B1 | 9/2003 | Tajima et al. | |
| 6,637,943 B1 * | 10/2003 | Novak et al. | ............ 384/477 |
| 6,644,861 B1 * | 11/2003 | Hacker et al. | ............ 384/589 |
| 6,729,633 B1 | 5/2004 | Irwin | |
| 6,736,418 B1 | 5/2004 | Wang | |
| 6,796,029 B1 | 9/2004 | Muxur et al. | |
| 6,829,825 B1 * | 12/2004 | Bowman et al. | ......... 29/894.32 |
| 2001/0045770 A1 | 11/2001 | Brinker et al. | |

(Continued)

FOREIGN PATENT DOCUMENTS

WO    WO 03/018376    3/2003

*Primary Examiner*—Jermie E. Cozart
(74) *Attorney, Agent, or Firm*—Leo H. McCormick, Jr.; Sarah Taylor

(57) ABSTRACT

A knuckle (16) for a corner assembly (10, 210, 310) wherein a cylindrical body (18) has an outboard race (39) and an inboard race (45) located therein for correspondingly receiving a first roller assembly (52) and a second roller assembly (94) carried by a wheel hub (56) such that brake engagement surfaces (12*a*) and (12*b*) on a rotor (12) are located in a parallel relationship with faces on a friction members (14*a*) and (14*b*) associated with caliper (14) and perpendicular with the axis of the wheel hub (56) to obtain a desired lateral run out relationship between the rotor (12) and the axis of the first (52) and second (94) roller assemblies retained in the wheel hub (56).

11 Claims, 3 Drawing Sheets

U.S. PATENT DOCUMENTS

2001/0048242 A1   12/2001   Brinker et al.
2002/0174543 A1   11/2002   Brinker et al.
2004/0046440 A1   3/2004   Brinker et al.

* cited by examiner

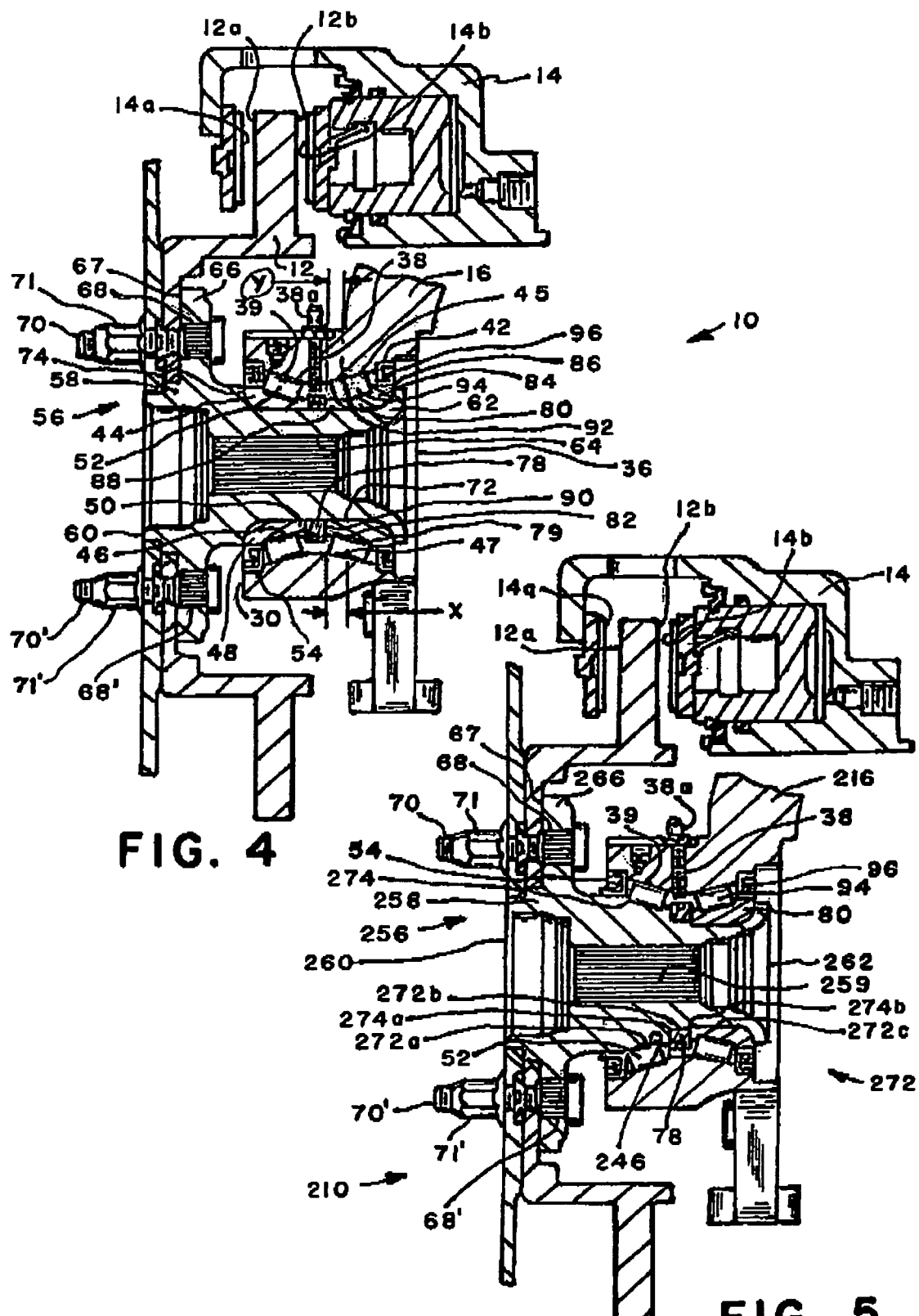

METHOD OF MANUFACTURING A CORNER ASSEMBLY

DESCRIPTION

This invention relates to a process of manufacturing a corner assembly having a knuckle with a cylindrical body that contains the outer raceways for a wheel bearing. The outer raceways retain bearing roller members which in turn retain a wheel hub such that when a rotor is affixed to the wheel hub, the rotor is aligned in a perpendicular relationship with the axis of the wheel hub.

BACKGROUND OF THE INVENTION

Disc brake systems are commonly use on a front axle of most vehicles because they are effective in stopping a vehicle. In such systems, a bearing assembly is fixed to a wheel hub that is bolted to a knuckle member, a brake rotor is thereafter attached to the wheel hub and a caliper that is bolted to the knuckle member spans the rotor. The knuckle member is pivotally attached to the frame of the vehicle and a caliper is bolted to the knuckle to locate first and second friction members on opposite sides of the rotor to define a corner assembly. During braking the friction members are moved into engagement with corresponding braking surfaces on the rotor to effect a brake application. Unfortunately, while the individual manufacturing tolerance of the various components that make up a corner assembly may be within desired limits when the tolerances are combined or added together a relationship may occur wherein a hub mounting surface on the wheel hub for the rotor and/or braking surface on the rotor are not in perpendicular alignment with the axis of the wheel bearing. A process has been disclosed in co-pending application Ser. No. 10/904,202 wich has been allowed and is drawn to manufacturing a modular corner assembly wherein surfaces on a wheel hub and knuckle are primarily machined in a single fixture to maintain a perpendicular relationship between the wheel hub and knuckle.

SUMMARY OF THE INVENTION

It is an object of the present invention to provide a corner module assembly for a vehicle wherein a knuckle has a cylindrical body with outboard and inboard races machined therein for receiving roller arrangements carried on a wheel hub such that a rotor affixed to the wheel hub is located in perpendicular alignment with the axis of the wheel hub.

In more detail, the knuckle and resulting modular corner assembly is manufactured through the following steps:

obtaining a knuckle from a source including at least the following characteristics, a first cylindrical body with a plurality of projections that extend there from for attachment to a vehicle and an axial bore that extends from a first end surface to a second end surface;

locating the knuckle in a fixture through the plurality of projections to simulate attachment to a vehicle;

holding the knuckle stationary while bringing a first tool into engagement with the knuckle to machine the axial bore and define an outboard race adjacent the first end surface, an inboard race adjacent the second end surface and an annular surface there between.

After case hardening the inboard race and outboard race, the knuckle is ready to be utilized in the manufacture of a modular corner assembly and may be retained in the same fixture through the further steps:

obtaining a wheel hub from a source including at least the following characteristics, a second cylindrical body with a first end and a second end, a second axial bore that extends from the first end to the second end, a radial mounting flange adjacent the first end and a peripheral bearing surface that extends from the second end to a shoulder adjacent the radial mounting flange;

obtaining an outboard cone from a source and pressing it onto the peripheral bearing surface of the wheel hub until it engages the shoulder;

pressing an outboard annular seal onto the outboard cone;

placing a first roller assembly on the outboard cone;

pressing a ring having sequential surface differences thereon onto the peripheral bearing surface until engagement with the outboard cone;

inserting the second end of the wheel hub into axial bore of the knuckle and moving the second cylindrical body toward the knuckle until the first roller assembly engages a first bearing surface defined by the outboard race, the outboard annular seal engages the first end surface of the knuckle to define an outboard seal and the sequential surface on the ring is aligned with a radial bore in the first cylindrical body;

measuring a first linear distance from a face on the ring to a first reference point on the first cylindrical body;

obtaining an inboard cone from a source:

placing a second roller assembly on the inboard cone;

measuring a second linear distance from a first end on the inboard cone to a second reference point on the second roller assembly;

comparing the first linear distance with the second linear distance and removing material from the inboard cone when the second linear distance is greater than the first linear distance to match the second linear distance with the first linear distance or selecting a different inboard cone form the source with a second linear distance that matches the first linear distance;

pressing said inboard cone onto the peripheral bearing surface of the second cylindrical body until cone engagement with the face on the ring and the second roller assembly engages a second bearing surface defined by the inboard race on the first cylindrical body;

pressing an inboard annular seal onto the inboard cone to bring the inboard annular seal into engagement with the second end surface of the knuckle to define an inboard seal with respect to the surrounding environment;

bringing a second tool into engagement with the second end of the second cylindrical body to deform the second end such that the inboard cone is retained in engagement with the ring to define a unitary structure.

While in the fixture a third tool may thereafter be brought into engagement with the annular flange on the wheel hub to remove material from the wheel hub that may effect a perpendicular surface relationship with respect to the axis of the first and second roller assemblies;

a fourth tool associated with the fixture is brought into engagement with the knuckle to remove material bosses thereon to define a surface for receiving a bracket for a caliper;

a rotor is placed on the perpendicular surface and secured to the wheel hub; and a fifth tool associated with the fixture is now brought into engagement with first and second surfaces on the rotor while rotating the wheel hub to remove any material from the rotor that may effect a corresponding perpendicular relationship with the axis of first and second roller assemblies and as a result of all of the machining takes place in a single fixture such that a perpendicular relationship is established such that friction members retained in a caliper may be axially aligned with the braking surfaces on the rotor.

It is an object of this invention to provide a knuckle and wheel hub for a vehicle constructed from a plurality of loose components that include two rows of robust bearings and seals wherein the end play for the bearings is individually set for each assembly.

It is a further object to this invention to provide a corner assembly for a vehicle wherein lateral run out for a rotor is reduced by machining a rotor while clamping on same projection on a knuckle that is used in the assembly of the roller bearings between the knuckle and wheel hub.

The present invention provides for a modular corner assembly wherein the braking surfaces on a rotor are located in a perpendicular relationship with the axis of a bearing while a caliper attached to a knuckle retains friction members in a same parallel relationship with the braking surfaces.

BRIEF DESCRIPTION OF THE DRAWINGS

FIG. 4 is a sectional view of a first modular corner assembly for a vehicle with the knuckle of FIG. 3;

FIG. 5 is a sectional view of a second modular corner assembly with the knuckle of FIG. 3.

DETAILED DESCRIPTION OF THE INVENTION

In the various embodiments for a modular corner assembly, some components are identified by the same number and only different structural components are given a new number.

Figure 6:
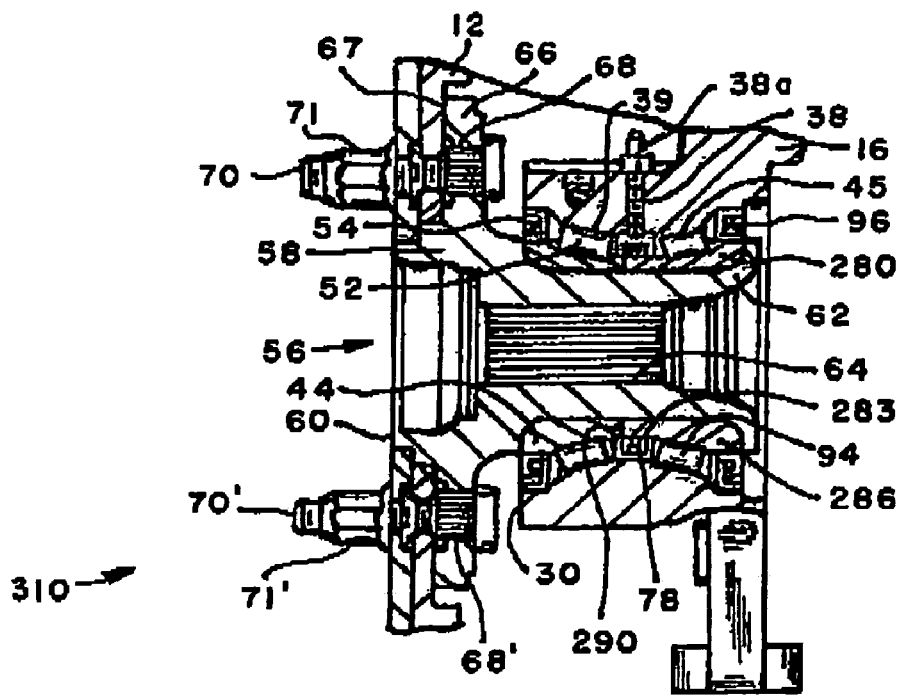
FIG. 6 is a sectional view of a third modular corner assembly wherein roller members are initially installed in the knuckle of FIG. 1 and a wheel hub is later installed to define a unitary structure.

The knuckle 16 of the present invention is shown as being located in corner assembly 10 illustrated in FIGS. 4, corner assembly 210 illustrated in FIG. 5 and corner assembly 310 of FIG. 6. Modular corner assemblies 10, 210 and 310 are manufactured through a succession of steps that are similar to the steps disclosed in co-pending U.S. patent application Ser. No. 10/904,202 which has been allowed and was filed on the same date as this application. The corner assemblies 10, 210 and 310 are distinguished in that knuckle 16 has an outboard surface and inboard surface that are machined therein to define races for bearings associated with a wheel hub 56 that are selected to match tolerance build up associated with the assembly and as a result braking surfaces 12a and 12b located on a rotor 12 are initially located and maintained in parallel alignment with wear faces on friction members 14a and 14b associated with a caliper 14 that spans the rotor 12. The parallel alignment enhances the uniform engagement of the wear and the braking surfaces such that surging that may occur after a period of time in a brake system is reduced and rotation retardation of a rotor 12 is a linear function of a force applied to move the friction members 14a and 14b into engagement with the rotor 12.

Figure 1:
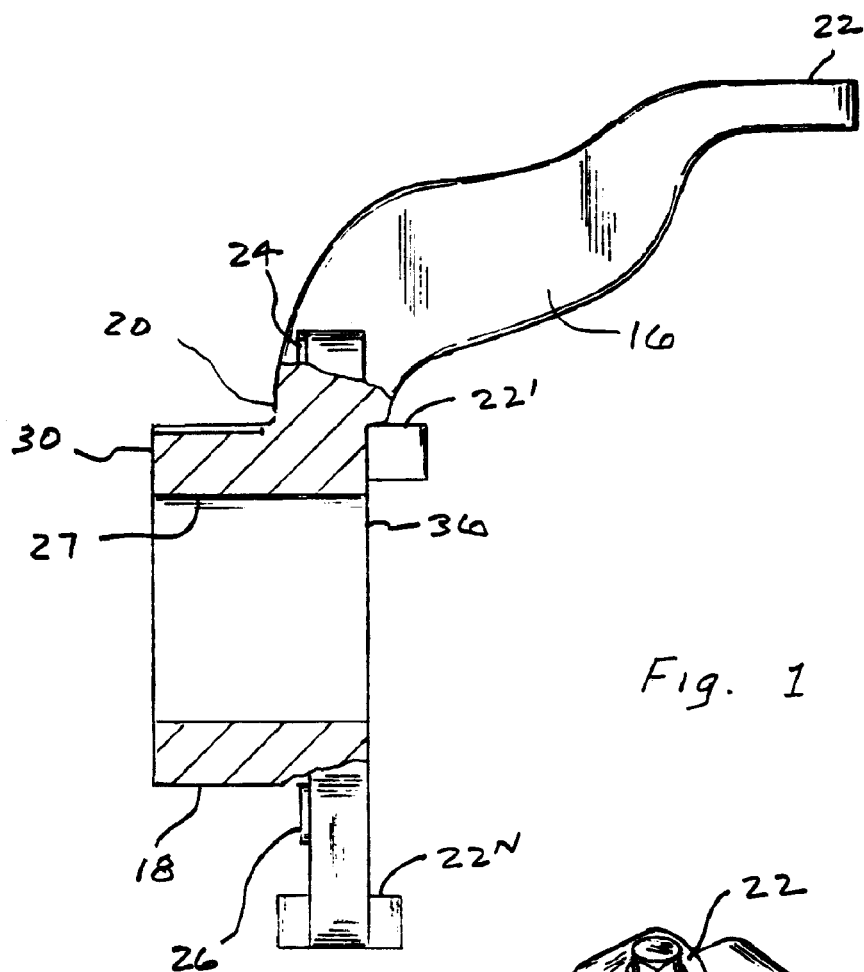
FIG. 1 is a sectional view of a knuckle for use in a modular corner assembly according to the present invention.
Figure 2:
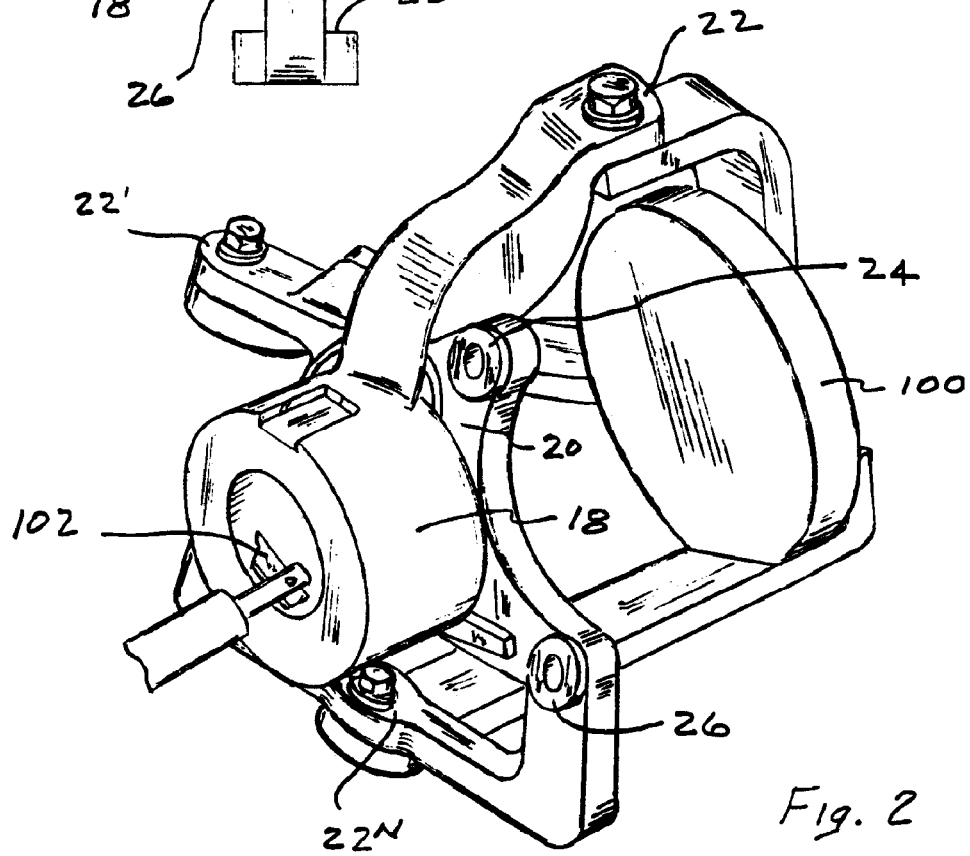
FIG. 2 is a perspective view of the knuckle of FIG. 1 located in a fixture wherein outboard and inboard races are machined in a cylindrical body of the knuckle.
Figure 3:
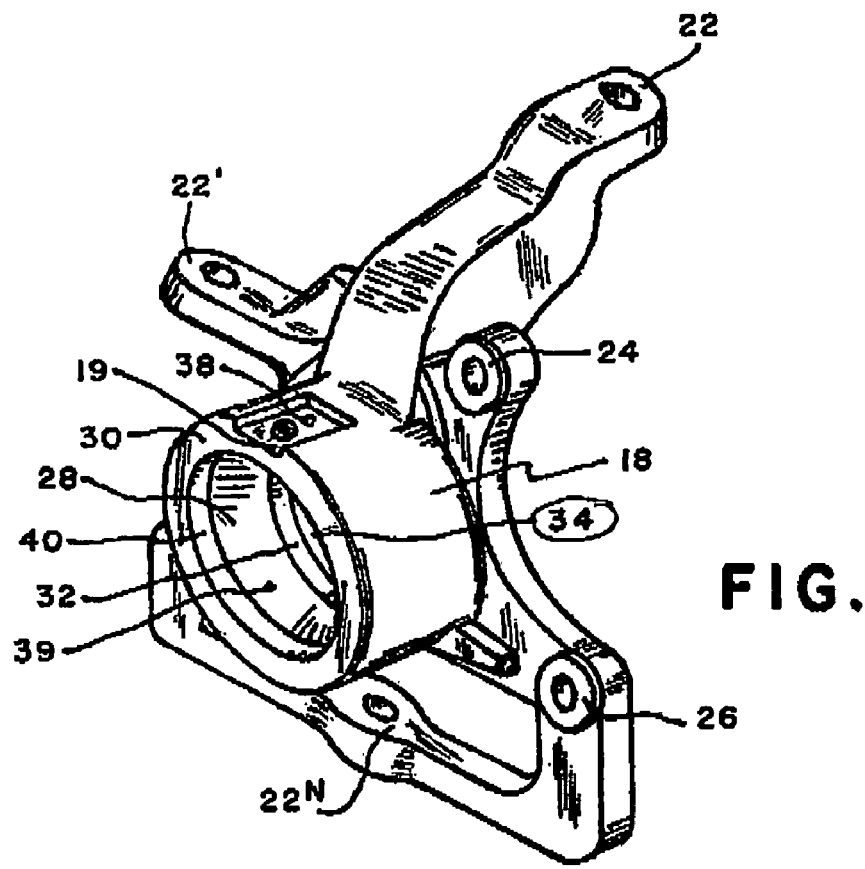
FIG. 3 is a perspective view of the knuckle of FIG. 2 after machining the cylindrical body.

In the present invention, the knuckle 16 as shown in FIG. 1 is cast or formed with the various surface characteristics as shown thereon. The knuckle 16 is obtained from a source and may be distinguished by a base 20 with a cylindrical body 18 that extends there from and bosses 24 and 26 located on the base 20. The cylindrical body 18 has an axial bore 27 that extends from a first end surface 30 to a second end surface 36. As shown the axial bore 27 has a same diameter but it could be stepped or partially formed in a manner similar to a desired shape as later machined therein. The knuckle 16 is placed in a fixture 100, as illustrated in FIG. 2, and retained therein in a stationary or fixed position through the attachment of a plurality of projections 22,22' . . . 22" with the fixture 100 to simulate attachment of a knuckle 16 with a vehicle. A tool 102 is brought into engagement with the axial bore 27 and an outboard section 28 machined therein that extends from a first end surface 30 and an inboard section 34 that extends from a second end surface 36 such that a small section 32 is left there between. A radial bore 38 is bored from peripheral surface 19 to the center of the small section 32 for the later attachment of a sensor member 38a. The outboard section 28 is ramped from a seal groove 40 adjacent to end surface 30 to the edge of the small section 32 to define an outboard race 39 while the inboard section 34 is ramped from a seal groove 42 adjacent to end surface 36 to the edge of the small section 32 to define an inboard race 45, as illustrated in FIGS. 3 and 4. The tool 102 as is shown is a blade but the tool could be a rotating member that removes material from the original surface of the axial bore 27 as long as a resulting outboard race 39 and inboard race 45 are finished to a desired tolerance and shape with respect to the axis of the cylindrical body 18 while being held in a fixed position in fixture 100. In a desired manner, the surfaces are rough turned through axial bore 27, induction heat treated and subsequently ground to obtain a desired tolerance. After the outboard race 39 and inboard race 45 have been machined to a desire specification, they are case hardened as they form bearing surfaces for roller member 52 and 94 in the modular corner assemblies. The resulting knuckle 16 could be used in a corner assembly wherein a snap ring, nut or a CVJ and a nut is attached to the cylindrical body of the wheel hub but may have more application in a modular corner assembly wherein the weight of the corner assembly is being reduced as illustrated by corner assembly 10 of FIG. 4 and corner assembly 210 of FIG. 5. The steps of such manufacturing modular corner assembly 10 and 210 are similar and the specific details of modular corner assembly 10 is hereinafter described in the following steps.

While in fixture 100, the plurality of projections 22,22' . . . 22" are attached to the fixture and the knuckle is retained in a stationary or fixed manner. A wheel hub 56 is obtained from a source and distinguished from a cylindrical body 58 with a first end 60 and a second end 62 with an axial bore 64 that extends from the first end 60 to the second end 62, a radial mounting flange 66 that extends from the cylindrical body 58 and is located between the first end 60 and the second end 62, a plurality of axial openings 68,68' located a fixed radial distance from the axis of the axial bore 64 for receiving mounting studs 70,70', and a peripheral bearing surface 72 that extends from the second end 62 to a shoulder 74 adjacent the radial mounting flange 66.

An outboard cone 44 is obtained from a source and defined by a ramped race 46 located between a flange 48 and a lip 50. An outboard seal 54 defined by inner and outer rings separated by a resilient member is obtained from a source and pressed onto the flange 48. Thereafter a first roller assembly 52 is obtained from a source and placed on the ramped race 46 of the outboard cone 44. The outboard cone 44 is thereafter pressed onto the peripheral bearing surface 72 of the wheel hub 56 until the cone 44 engages shoulder 74. Then a ring 78 having sequential surface differences (teeth or different material) is obtained from a source and pressed onto the peripheral bearing surface 72 until the ring 78 engages the outboard cone 44 to complete a sub assembly of the outboard roller 52 onto the wheel hub 56. As an alternative method of locating the ring 78 on peripheral bearing surface 72, is suggested by locating the ring 78 on an extension from lip 50 such that face 79 is located at the end face of the an outboard cone.

Thereafter, the wheel hub 56 is inserted into axial bore 27 from the first surface area 30 of cylindrical body 18 and moved toward the second surface area 36 of knuckle 16 until the first roller assembly 52 engages a first bearing surface 39 defined in the outboard section 28, the outboard annular seal 54 engages the first end surface 30 to define an outboard seal from the surrounding environment and the sequential surface on the ring 78 is aligned with a radial bore 38 in the first cylindrical body 18.

Thereafter a first linear distance "x" is measured from a face 79 on ring 78 to a first reference point 47 on the bearing surface of race 45 of the inboard section 34 of axial bore 27. This measurement "x" is important and represents a tolerance build up that occurs during the assembly of the component to this point and is used in selecting an inboard cone 80 from a source. The inboard cone 80 is defined by a ramped race 82 that is located between a flange 84 on a first end 86 and a lip 88 on a second end 90. A second roller assembly 94 is selected from a source and placed on the ramped race 82 on the second inboard cone 80. A reference point 92 is located on the second roller assembly 94 defines a second linear distance "y" between the reference point and the second end 90. The second linear distance "y" is compared with the first linear distance "x" and will compensate for any stack up of tolerances that may later affect a parallel relationship of the components in the corner assembly 10. If the second linear distance "y" is greater than the first linear distance "x" material is removed from the second end 90 until the second linear distance "y" for this particular second inboard cone 80 matches the first linear distance "x" or another cone is selected from the source that does have a desired second linear distance. Once the second linear distance "y" matches the first linear distance "x", the inboard cone 80 is pressed onto the peripheral bearing surface 72 of the second cylindrical body 56 until the second end 90 on inboard cone 80 engages face 79 on ring 78 and the second roller assembly 94 engages a second bearing surface 47 defined by ramp race 45 on the inboard section 34 of axial bore 27. Then an inboard annular seal 96 is selected from a source and aligned with the flange 84 on the first end of the second inboard cone 80 and pressed into axial bore 27 until engagement with the second end surface 36 such that an inboard seal is created with respect to the surrounding environment.

At this point in time of the assembly, a snap ring, nut or CVJ and nut could be attached to the second end 62 of cylindrical body 58 to hold the wheel hub 58 and knuckle 16 together and define a unitary structure but in an effort to reduce the number of components and define a modular assembly according to the present invention, while in the fixture 100 or with the knuckle 16 being held in fixture 100 a second tool, not shown, is brought into engagement with the second end 62 of second cylindrical body 58 and the second end 62 is deformed into engagement with the first end 84 of the inboard cone 80 to retain the second end 90 in engagement with face 79 on ring 78 and define a unitary structure.

In order to enhance an alignment relationship established between the axis of the wheel hub 56 and the plurality of projections 22,22' . . . 22" on the knuckle 16 while in fixture 100 it is also desirable to machine various other surfaces on the wheel hub 56 including the face 67 on radial flange 66 and bosses 24 and 26 on knuckle 16. This is achieved by a second tool (not shown) being brought into engagement with face 67 on the annular flange 66 on the wheel hub 56 and material removed from the face 67 to establish a surface thereon that is perpendicular to the axis of wheel hub 56 and the first 52 and second 94 roller assemblies retained thereon and by a third tool (not shown) being brought into engagement with bosses 24 and 26 to remove material on the knuckle 16 and assure a bracket for caliper 14 is in a corresponding perpendicular relationship with the axis of the first 52 and second 94 roller assemblies. A sensor 38a is inserted into radial bore 38 and a rotor 12 is obtained from a source and thereafter placed on the wheel hub 56 to engage the perpendicular surface defined by face 67 and is secured thereto by nuts 71,71' attached to studs 70,70' or held by a clamping member in a fixed relationship on the wheel hub 56. The machining in fixture 100 is completed by a fourth tool, not shown, being brought into engagement with braking surfaces 12a and 12b on rotor 12 and any material removed there from that would affect a perpendicular relationship between the axis of the wheel hub 56 and the braking surface 12a and 12b. The knuckle 16 with the rotor 12 attached thereto is removed from fixture 100 and caliper 14 is bolted onto bosses 24 and 26 to complete the manufacture of the modular corner assembly 10 as illustrated in FIG. 4. The surfaces on the friction members 14a and 14b are located adjacent to braking surfaces 12 and 12b such that parallel alignment is maintained on rotation of a wheel that is attached to studs 70,70'. Thereafter, the modular corner assembly 10 may hereinafter be attached through the plurality of projections 22,22' . . . 22" to a vehicle.

The embodiment for the modular corner assembly 10 as illustrated in FIG. 4 may be modified as illustrated in FIG. 5 to define a modular corner assembly 210 wherein a portion of the peripheral bearing surface 272c on the wheel hub 256 is used as the outboard race for the first roller member 52. The wheel hub 256 is selected from a source and defined by a cylindrical body 258 with a first end 260 and a second end 262 with splined axial bore 259 that extends from the first end 260 to the second end 262 and is distinguished by a peripheral bearing surface 272 that extends from the second end 262 to a first shoulder 274 adjacent radial flange 266. The peripheral bearing surface 272 has a first section 272a that extends from first shoulder 274 to a second shoulder 274a, a second section 272b that extends from the second shoulder 274a to a third shoulder 274b and a third section 272c that extends from the third shoulder 274b to the second end 262. The first section 272a has a varying first diameter, the second section 272b has a second diameter and the third section 272c has a third diameter such that the varying diameter is larger than the second diameter and the second diameter is larger than the third diameter. The varying diameter of the first section 272a forming a ramped race 246 for the roller assembly 52. In the method of assembly of modular corner assembly 210, the roller assembly 52 is inserted into the axial bore 27 of knuckle 16 until it engages a bearing surface on race 39 on the outboard section 28 and the annular seal 54 engages end surface 30 of housing 18 for knuckle 16. Thereafter, the wheel hub 256 is inserted into axial bore 27 and brought into engagement with the roller assembly 52 such that the second section 272b is aligned with radial bore 38 in the cylindrical body 18. The ring 78 is thereafter pressed onto the second section 272b and the remaining steps of attaching and retaining the inboard cone 80, roller assembly 94 and seal 96 are attached in a similar manner as with modular corner assembly 10 to define a unitary structure. The machining of the wheel hub 256 and knuckle 14 in a same fixture 100 is identical to that described above with respect to modular corner assembly 10.

The embodiment of FIG. 4 may also be modified through the use of a different inboard cone 280 as illustrated in FIG. 6 to define corner module 310 wherein the ring 78 is carried on surface 283 of cone 280. During assembly, the outboard cone 44 with roller assembly 52 is inserted into the axial bore 27 and a linear distance x is obtained by measuring a first linear distance from a reference point on the outboard cone to a second reference point on the inboard race. Thereafter, linear distance x is utilized to select an inboard cone 280 having a linear distance y. If linear distance y of the selected cone 280 does not match linear distance x some material may have to be removed from face 290 of an inboard cone 280 to obtain such a match. When the match is achieved, the inboard cone 280 is inserted into the axial bore 27 and seals 54 and 96 located between cones 44 and 280 and the knuckle 16 to seal the axial bore 27. Thereafter, the cylindrical body 58 of the wheel hub 56 is pressed into cone 44 and cone 280 such that end 62 extends past flange 286 of cone 280. The remaining steps of deforming end 62 to retaining the inboard cone 280 are the as with the modular corner assembly 10 to define a unitary structure.

What is claimed is:

1. A method of manufacturing a corner assembly for a vehicle through the following steps:
    obtaining a knuckle from a source, said knuckle having a first cylindrical body with a plurality of projections that extend there from, an axial bore that extends from a first end surface to a second end surface;
    locating said knuckle in a fixture;
    holding said knuckle stationary while bringing a first tool into engagement with said knuckle to machine an outboard race in said axial bore adjacent to said first end surface and an inboard race in said axial bore adjacent to said second end surface with an annular surface there between;
    obtaining a wheel hub from a source, said wheel hub being defined by a second cylindrical body with a first end and a second end, a second axial bore that extends from the first end to the second end, a radial mounting flange that extends from the second cylindrical body and is located between said first end and said second end, and a peripheral bearing surface that extends from said second end to a shoulder adjacent said radial mounting flange;
    obtaining an outboard cone from a source;
    placing a first roller assembly on said outboard cone;
    pressing an outboard annular seal onto said outboard cone;
    pressing said outboard cone onto said peripheral bearing surface of said wheel hub until said outboard cone engages said shoulder on said second cylindrical body;
    pressing a ring onto said peripheral bearing surface of said second cylindrical body until said ring engages said outboard cone, said ring having sequential surface differences thereon;
    inserting said second end of said second cylindrical body into said axial bore of said first cylindrical body and moving said second cylindrical body toward said knuckle until said first roller assembly engages a first bearing surface defined by said outboard race, said outboard annular seal engages said first end surface to define an outboard seal with respect to the surrounding environment and said sequential surface on said ring is aligned with a radial bore in said first cylindrical body;
    measuring a first linear distance from a face on said ring to a first reference point on said first cylindrical body;
    obtaining an inboard cone from a source:
    placing a second roller assembly on said inboard cone;
    measuring a second linear distance from a first end of said inboard cone to a second reference point located on said second roller assembly;
    comparing said first linear distance with said second linear distance and removing material from said inboard cone when said second linear distance is greater than said first linear distance to match said second linear distance with said first linear distance;
    pressing said inboard cone onto said peripheral bearing surface of said second cylindrical body until said inboard cone engages said face on said ring and said second roller assembly engages a second bearing surface defined by said inboard race on said first cylindrical body;
    pressing an inboard annular seal onto said inboard cone to bring said inboard annular seal into engagement with said second end surface to define an inboard seal with respect to the surrounding environment and;
    bringing a second tool into engagement with said second end of said second cylindrical body of said second cylindrical body to deform said second end such that said inboard cone is retained in engagement with said ring to define a unitary structure.

2. The method of manufacturing a corner assembly as recited in claim 1 wherein said step of holding said knuckle stationary in said fixture further including the step of:
    bringing a third tool into engagement with said radial mounting flange on said second cylindrical body and removing material there from to obtain a perpendicular relationship with respect to an axis of said wheel hub.

3. The method of manufacturing a corner assembly as recited in claim 2 wherein said step of holding said knuckle stationary in said fixture further including the step of:
    attaching a rotor to said radial mounting flange and thereafter bringing a fourth tool into engagement with a braking surface on the rotor to remove any material there from not located in a first perpendicular or second perpendicular plane with respect to the axis of said wheel hub.

4. The method of manufacturing a corner assembly as recited in claim 3 further including the step of:
    case hardening at least said outboard race and inboard race of said axial bore in said first cylindrical body.

5. A method of manufacturing a corner assembly for a vehicle through the following steps:
    obtaining a knuckle from a source, said knuckle having a first cylindrical body with a plurality of projections that extend there from, an axial bore that extends from a first end surface to a second end surface;
    locating said knuckle in a fixture;
    holding said knuckle stationary while bringing a first tool into engagement with said knuckle to machine an outboard race in said axial bore adjacent said first end surface and an inboard race in said axial bore adjacent said second end surface with an annular surface there between;

obtaining a wheel hub from a source, said wheel hub being defined by a second cylindrical body with a first end and a second end, a second axial bore that extends from the first end to the second end, a radial mounting flange that extends from the second cylindrical body and is located between said first end and said second end, and a peripheral bearing surface that extends from said second end to a first shoulder adjacent said radial mounting flange, said peripheral bearing surface being defined by a first section that extends from said first shoulder to a second shoulder and a second section that extends from said second shoulder to a third shoulder and a third section that extends from said third shoulder to said second end, said first section having a variably first diameter, said second section having a second diameter and said third section having a third diameter such that said first diameter is larger and increases from said second diameter and said second diameter is larger than said third diameter;

pressing an outboard annular seal onto said second cylindrical body between said flange and said first shoulder;

locating a first roller assembly on said first section of said peripheral bearing surface;

pressing said second cylindrical body into said axial bore of said first cylindrical body such that said outboard bearing assembly engages said first race, said second section is aligned with a radial bore in said first cylindrical body and said outboard annular seal engages said first end surface to define an outboard seal with respect to the surrounding environment;

obtaining a ring having a surface with sequential differences thereon;

inserting said ring into said axial bore from said second end surface of said first cylindrical body;

pressing said ring onto the second section of said peripheral bearing surface of said second cylindrical body until engaged with said second shoulder;

measuring a first linear distance from a face on said ring to a first reference point on said first cylindrical body;

obtaining a cone from a source:

placing a said second roller assembly on said cone;

measuring second linear distance from a first end of said cone to a second reference point located on second roller assembly;

comparing said first linear distance with said second linear distance;

removing material from said cone when said second linear distance is greater than said first linear distance to match said second linear distance with said first linear distance;

pressing said cone onto said third section of said peripheral bearing surface of said second cylindrical body until said cone engages said end surface on said ring;

pressing an inboard annular seal onto said cone such that said inboard annular seal engages said second of said second cylindrical body face on said first cylindrical body to define an inboard seal with respect to the surrounding environment and;

bringing a second tool into engagement with said second end of said second cylindrical body to deform said second end and define a unitary structure.

6. The method of manufacturing a corner assembly as recited in claim 5 wherein said step of holding said knuckle stationary in said fixture further including the step of:

bringing a third tool into engagement with said radial mounting flange on said second cylindrical body and removing material there from to obtain a perpendicular relationship with respect to an axis of said wheel hub.

7. The method of manufacturing a corner assembly as recited in claim 6 wherein said step of holding said knuckle stationary in said fixture further including the step of:

attaching a rotor to said radial mounting flange and thereafter bringing a fourth tool into engagement with a braking surface on the rotor to remove any material there from not located in a first perpendicular or second perpendicular plane with respect to the axis of said wheel hub.

8. The method of manufacturing a corner assembly as recited in claim 7 further including the step of:

case hardening at least said outboard race and inward race of said axial bore in said first cylindrical body.

9. A method of manufacturing a corner assembly for a vehicle through the following steps:

obtaining a knuckle from a source, said knuckle having a first cylindrical body with a plurality of projections that extend there from, an axial bore that extends from a first end surface to a second end surface;

locating said knuckle in a fixture by said plurality of projections to simulate attachment to a vehicle;

holding said knuckle stationary while bringing a first tool into engagement with said knuckle to machine an outboard race in said axial bore adjacent said first end surface and an inboard race in said axial bore adjacent said second end surface with an annular surface there between;

obtaining a wheel hub from a source, said wheel hub being defined by a second cylindrical body with a first end and a second end, a second axial bore that extends from the first end to the second end, a radial mounting flange that extends from the second cylindrical body and is located between said first end and said second end, and a peripheral bearing surface that extends from said second end to a shoulder adjacent said radial mounting flange;

obtaining an outboard cone from a source;

placing a first roller assembly on said outboard cone;

pressing an outboard annular seal onto said outboard cone;

pressing said outboard cone onto said peripheral bearing surface of said wheel hub until said outboard cone engages said shoulder on said second cylindrical body;

pressing a ring onto said peripheral bearing surface of said second cylindrical body until said ring engages said outboard cone, said ring having sequential surface differences thereon;

inserting said second end of said second cylindrical body into said axial bore of said first cylindrical body and moving said second cylindrical body toward said knuckle until said first roller assembly engages a first bearing surface defined by said outboard race, said outboard annular seal engages said first end surface to define an outboard seal with respect to the surrounding environment and said sequential surface on said ring is aligned with a radial bore in said first cylindrical body;

measuring a first linear distance from a face on said ring to a first reference point on said first cylindrical body;

obtaining an inboard cone from a source:

placing a second roller assembly on said inboard cone;

measuring a second linear distance from a first end of said inboard cone to a second reference point located on said second roller assembly;

comparing said first linear distance with said second linear distance and removing material from said inboard cone when said second linear distance is greater than said first linear distance to match said second linear distance with said first linear distance;

pressing said inboard cone onto said peripheral bearing surface of said second cylindrical body until said inboard cone engages said face on said ring and said second roller assembly engages a second bearing surface defined by said inboard race on said first cylindrical body;

pressing an inboard annular seal onto said inboard cone to bring said inboard annular seal into engagement with said second end surface to define an inboard seal with respect to the surrounding environment; and holding a second end of said inboard cone in a stationary position on said peripheral bearing surface to retain said first end of said inboard cone in engagement with said ring to define a unitary structure.

10. A method of manufacturing a corner assembly for a vehicle through the following steps:

obtaining a knuckle from a source, said knuckle having a first cylindrical body with a plurality of projections that extend there from, an axial bore that extends from a first end surface to a second end surface;

locating said knuckle in a fixture;

holding said knuckle stationary while bringing a first tool into engagement with said knuckle to machine an outboard race in said axial bore adjacent said first end surface and an inboard race in said axial bore adjacent said second end surface with an annular surface there between;

obtaining a wheel hub from a source, said wheel hub being defined by a second cylindrical body with a first end and a second end, a second axial bore that extends from the first end to the second end, a radial mounting flange that extends from the second cylindrical body and is located between said first end and said second end, and a peripheral bearing surface that extends from said second end to a shoulder adjacent said radial mounting flange;

obtaining an outboard cone from a source;

placing a first roller assembly on said outboard cone;

pressing an outboard annular seal onto said outboard cone;

pressing a ring onto said outboard cone, said ring having sequential surface differences thereon;

inserting said second end of said second cylindrical body into said axial bore of said first cylindrical body and moving said second cylindrical body toward said knuckle until said first roller assembly engages a first bearing surface defined by said outboard race, said outboard annular seal engages said first end surface to define an outboard seal with respect to the surrounding environment and said sequential surface on said ring is aligned with a radial bore in said first cylindrical body and said ring is aligned with said radial bore in said first cylindrical body;

measuring a first linear distance from a face on said ring to a first reference point on said first cylindrical body;

obtaining an inboard cone from a source:

placing a second roller assembly on said inboard cone;

measuring a second linear distance from a first end of said inboard cone to a second reference point located on said second roller assembly;

comparing said first linear distance with said second linear distance and removing material from said inboard cone when said second linear distance is greater than said first linear distance to match said second linear distance with said first linear distance;

pressing said inboard cone onto said peripheral bearing surface of said second cylindrical body until said inboard cone engages said face on said ring and said second roller assembly engages a second bearing surface defined by said inboard race on said first cylindrical body;

pressing an inboard annular seal onto said inboard cone to bring said inboard annular seal into engagement with said second end surface to define an inboard seal with respect to the surrounding environment; and holding a second end of said inboard cone in a stationary position on said peripheral bearing surface to retain said first end of said inboard cone in engagement with said ring to define a unitary structure.

11. A method of manufacturing a corner assembly for a vehicle through the following steps:

obtaining a knuckle from a source, said knuckle having a first cylindrical body with a plurality of projections that extend there from, an axial bore that extends from a first end surface to a second end surface and a radial bore;

retaining said knuckle in a fixture;

holding said knuckle stationary while bringing a first tool into engagement with said knuckle to machine an outboard race in said axial bore adjacent said first end surface and an inboard race in said axial bore adjacent said second end surface with an annular surface there between;

obtaining an outboard cone from a source and placing a first roller assembly on said outboard cone;

inserting said outboard cone into said axial bore to bring said first roller assembly into engagement with a first bearing surface on said outboard race;

measuring a first linear distance from a reference point on said outboard cone to a second reference point on said inboard race;

obtaining an inboard cone from a source, said inboard cone having a third axial bore that extends from a first end to a second end, placing a second roller assembly on said inboard cone;

measuring a second linear distance from an end on said inboard cone to a reference point on said second roller assembly;

comparing said first linear distance with said second linear distance;

removing material from said inboard cone when said second linear distance is greater than said first linear distance to match said second linear distance with said first linear distance;

obtaining a ring having a surface with sequential differences thereon from a source and placing said ring on said inboard cone;

inserting said inboard cone into said axial bore of said knuckle to bring said second roller assembly into engagement with a bearing surface on said inboard race and to align said ring with said radial bore in said first cylindrical body;

placing a first seal between said first end surface on said knuckle and said outboard cone and a second seal between said second end surface on said knuckle and said inboard cone to seal said axial bore from the surrounding environment;

placing said knuckle in a fixture;

obtaining a wheel hub from a source, said wheel hub being defined by a second cylindrical body with a first end and a second end, a second axial bore that extends from the first end to the second end, a radial flange that extends from said second cylindrical body and is located adjacent said first end, said flange having a plurality of axial openings that are located a fixed radial distance from an axis of said second axial bore, and a peripheral bearing surface that extends from a shoulder adjacent said flange to said second end;

pressing said second cylindrical body of said wheel hub into said outboard cone and said inboard cone such that said shoulder engages said outboard cone and said second end extends past said inboard cone and said outboard cone and said inboard cone are located on said peripheral bearing surface on said wheel hub; and holding said second end of said inboard cone in a stationary position on said peripheral bearing surface to retain said first end of said inboard cone in engagement with said ring to define a unitary structure.

* * * * *